Nov. 5, 1935.  C. PENATI  2,019,828

FREEWHEEL CLUTCH FOR HEAVY LOADS

Filed July 20, 1933

Inventor.
Carlo Penati.
By Sommers & Young attys.

Patented Nov. 5, 1935

2,019,828

UNITED STATES PATENT OFFICE 2,019,828

FREEWHEEL CLUTCH FOR HEAVY LOADS

Carlo Penati, Turin, Italy, assignor to Fiat Società Anonima, Turin, Italy

Application July 20, 1933, Serial No. 681,364
In Italy December 31, 1932

5 Claims. (Cl. 192—45)

The free wheel clutch has already been largely employed in various types of machines and is being employed at present also for road vehicles. In the latter case, however, the load ranges always between narrow limits.

If the free wheel clutches of the types known heretofore were subjected to heavy loads, as they occur for example in motor-rail vehicles, difficulties would arise owing to the fact that coupling and uncoupling of the free wheel is not performed instantaneously when the synchronism is reached and when the driving member is retarded in rotation with respect to the driven member, respectively.

The object of this invention is to provide a free wheel clutch for heavy loads, which eliminates the above disadvantages.

According to this invention blocks are arranged in a manner known per se on wings of the driving clutch member with the interposition of spring means, said blocks bearing by a cylindrical surface against the race of the driven member and sliding along the same, and tending to push the balls or rollers into the engaged position.

According to this invention the wings of the driving member are spaced from the race of the driven member, and the push blocks move without friction with respect to the race of the driving clutch member. By this arrangement, when the speed of the driven member becomes greater than that of the driving member, the pushblocks are carried along by friction by the former and the spring means are compressed promptly uncoupling the clutch. The free wheel clutches known heretofore are not dependable in this respect owing to the friction between the wings of the driving member on the driven member and the friction between the push blocks and the driving member.

According to this invention the engagement is effected promptly at the desired moment by virtue of the fact that the push blocks are caused to contact with the rollers or balls only by the portion of their face turned towards the rollers or balls which is adjacent to the driving member. Consequently, the balls are pushed to the engaged position by a force strongly inclined to and directed towards the race on the driven member, instead of by a force tangential to said race.

The accompanying drawing shows, by way of example, a construction of the free wheel according to this invention.

Figure 1:
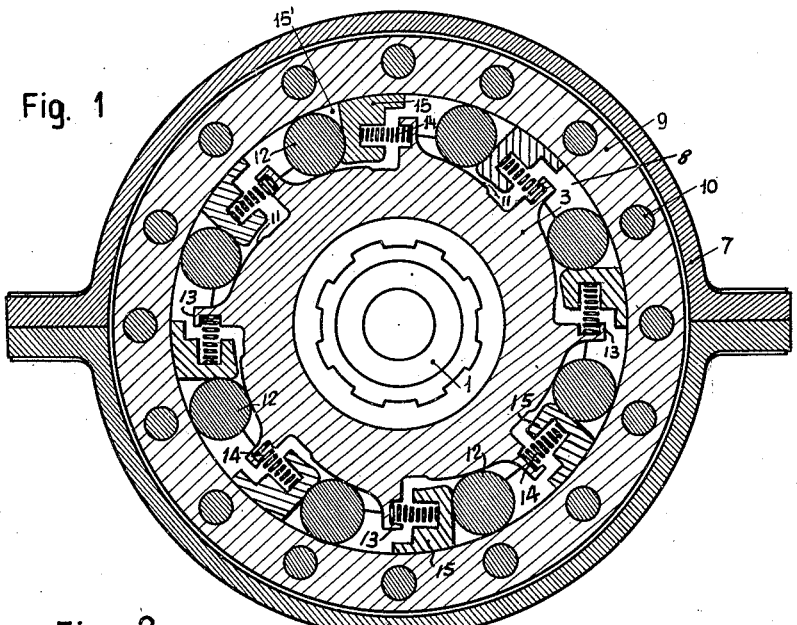
Figure 2:
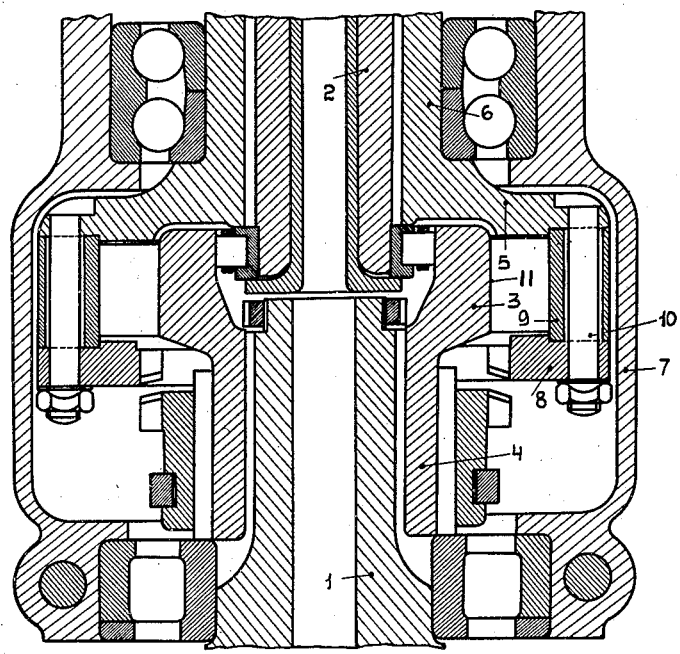

Figures 1 and 2 show the free wheel in cross and axial section respectively.

The driving shaft 1 and the driven shaft 2 are in alignment with each other, the end of the latter being rotatable on a roller bearing in a cylindrical member 3 connected to the end of the driving shaft by means of a hub 4, on the outside surface of which the inner roller races for the free wheel are recessed. The said shaft 2 carries, by means of a hub 6, the disc 5 constituting the side wall of the roller box. The shaft 1 and the hub 6 (and consequently the shaft 2), are rotatable on ball and roller bearings, respectively of a cylindrical box 7. The other side wall of the roller box is formed by an annular disc 8. Between the two discs 5 and 8 is placed the ring 9 which carries the outer race of the free wheel. The ring 9 is fixed to the discs 5 and 8 by means of bolts 10.

The member 3 carries the inner spiral races 11 for the rollers 12 and the radial wings 13 which divide the space between the cylindrical body 3 and the ring 9 into compartments for the rollers. The radial wings 13 do not touch the ring 9. 15 indicates the push blocks acting on the rollers 12; and 14 denotes the springs placed between the wings 13 and the push blocks 15. The outer cylindrical surface of the push blocks 15 slides on the race on the ring 9 but the blocks are spaced from the member 3. Consequently, as the push blocks are without friction on the race of the driving member 3, the ring 9 in its clockwise rotation with respect to the inner clutch member 3 will promptly carry along the blocks 15 against the action of the springs immediately loosening the rollers. The front surface of the push blocks 15 fits the surface of the rollers only on its lower portion (i. e. towards the inner race) while its upper portion is detached from the rollers as indicated at 15'. This particular form of push block is an important feature of the invention and is essential for safe engagement of the clutch members in any condition of transmission and lubrication, while this would not occur, under heavy loads, if the push blocks should also abut on the roller with their upper surface 15'.

The principle of the free wheel is well known. When the angular speed of the member 3, driven by the motor shaft 1, is greater than that of the box 5, 9, 8 driven by the driven shaft, the rollers 12 run in the spiral races 11 in the opposite direction as the shaft 1, being wedged between the spiral races 11 and the cylindrical race which are thus connected for rotation. Consequently the ring 9 undergoes a compression and a deformation in a radial direction limited by the bolts 10. The ring 9 is symmetrically deformable throughout its width which ensures a uniform distribution of load throughout the length of the rollers.

The details of construction of the free wheel clutch may be varied from that illustrated by way of example, according to space requirements, weight and use, without departing from the scope of the invention.

I claim:

1. A free wheel clutch comprising, in combination, a driven member, a cylindrical race on said driven member, a driving member, radial equidistant wings on said driving member, spiral races between said wings, said wings being spaced from the race on said driven member, rollers between said spiral races and cylindrical race, push blocks between said rollers and said wings, said push blocks being spaced from said driving member and hence being without friction with said driving member and having cylindrical surfaces sliding on the cylindrical race on said driven member, and spring means for urging said push blocks against said rollers.

2. A free wheel clutch comprising, in combination, a driven member, a cylindrical race on said driven member, a driving member, radial equidistant wings on said driving member, spiral races between said wings, said wings being spaced from the race on said driven member, rollers between said spiral races and cylindrical race, push blocks between said rollers and said wings, said push blocks being without friction with the races on said driving member and having cylindrical surfaces sliding on the cylindrical race on said driven member and their face turned towards the corresponding rollers closely fitting with the cylindrical surface of said rollers only on its portion adjacent to said driving member, while the remaining portion is detached from the co-operating roller, and spring means for urging said push blocks against said rollers.

3. A free wheel clutch comprising, in combination, a driven member formed by a ring, a driving member surrounded by said ring, radial equidistant wings on the periphery of said driving member, spiral races between said wings, said wings being spaced from the inner surface of said ring, rollers between said spiral races and the inner surface of said ring, push blocks between said rollers and said wings, said push blocks being spaced from said driving member and hence being without friction with said driving member and having cylindrical surfaces sliding on the inner surface of said ring, and spring means for urging said push blocks against said rollers.

4. A free wheel clutch comprising, in combination, a driven axle, a disc fixed to said axle, a ring fixed on one face of said disc, an annular disc fixed on the face edge of said ring, the connecting means between said ring and said discs comprising bolts traversing said ring with a little radial clearance, a driving member surrounded by said ring, radial equidistant wings on the periphery of said driving member, spiral races between said wings, said wings being spaced from the inner surface of said ring, rollers between said spiral races and the inner surface of said ring, push blocks between said rollers and said wings, said push blocks being without friction with the races on said driving member and having cylindrical surfaces sliding on the inner surface of said ring, and spring means for urging said push blocks against said rollers.

5. A free wheel clutch comprising, in combination, a driven axle, a disc fixed to said axle, a ring fixed to one face of said disc, an annular disc fixed at the face edge of said ring, the connecting means between said ring and said discs comprising bolts traversing said ring with a little radial clearance, a driving member surrounded by said ring, radial equidistant wings at the periphery of said driving member, spiral races between said wings, said wings being spaced from the inner surface of said ring, rollers between said spiral races and the inner surface of said ring, push blocks between said rollers and said wings, said push blocks being without friction with the races on said driving member and having cylindrical surfaces sliding on the inner surface of said ring and their face turned towards the corresponding rollers closely fitting with the cylindrical surface of said rollers only on its portion adjacent to said driving member, while the remaining portion is detached from the co-operating roller, and spring means for urging said push blocks against said rollers.

CARLO PENATI.